R. THUM.
SANITARY TOOTH CLEANER.
APPLICATION FILED DEC. 28, 1920.

1,414,604.

Patented May 2, 1922.

Inventor
Rudolph Thum
By his Attorney

UNITED STATES PATENT OFFICE.

RUDOLF THUM, OF BALDWIN, NEW YORK.

SANITARY TOOTH CLEANER.

1,414,604.  Specification of Letters Patent.  Patented May 2, 1922.

Application filed December 28, 1920. Serial No. 433,616.

*To all whom it may concern:*

Be it known that I, RUDOLF THUM, a citizen of the United States, and resident of town of Baldwin, Long Island, county of Queens, State of New York, have invented certain new and useful Improvements in Sanitary Tooth Cleaners.

This invention relates to improvements in sanitary tooth cleaners and has for its principal object to provide a device which may be utilized to remove foreign substance from between the teeth.

Another object of the invention is to provide a device which may be used for pushing the gums upward and away from the teeth in such a manner as to remove particles of food or other foreign substances and prevent the contraction of disease commonly known as pyorrhea.

Still another object of the invention is to provide a device which is constructed so as to utilize a small portion of dental floss or similar strand of relatively fine material and hold the same in such position that it may be readily inserted between the teeth for the removal of foreign matter.

As a further object the invention contemplates the provision of a device which may also be utilized as an ordinary tooth pick and wherein the gum engaging member may be folded into such position as to protect the end of the pick and protect the point.

With these and other objects in view the invention consists of a novel construction, combination and arrangement of parts which will be fully set forth in the following specification, claimed and illustrated in the accompanying drawings in which:—

Figure 1:
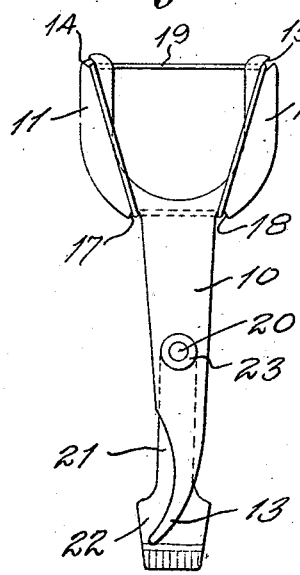
Fig. 1, is a side view of my improved sanitary tooth cleaner.
Figure 2:
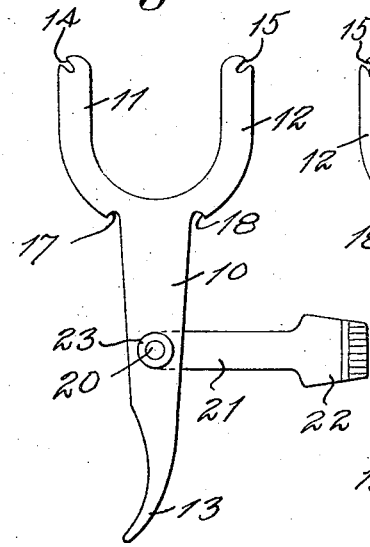
Fig. 2, is a view similar to Fig. 1 showing the dental floss removed and illustrating the gum massaging member turned outwardly at right angles to the shank.

Referring to the drawings in detail the numeral 10 designates the shank of this improved tooth cleaner which is provided at one end with a pair of parallel arms 11 and 12 and at the opposite end with a pick point 13. The arms 11 and 12 are provided adjacent their outer ends with the notches 14 and 15 respectively and at the point where said arms join the shank notches 17 and 18 are provided and are arranged to co-operate with the notches 14 and 15 in holding the strand 19 of dental floss in place. It is to be understood that if so desired an elastic member such as a rubber band, may be substituted for the dental floss.

Figure 6:
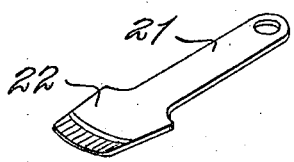
Fig. 6, is a perspective view of the gum massaging member.

Pivoted intermediate the ends of the shank 10 as at 20 is an arm 21 carrying at its free end the gum massaging member 22 which is slightly curved as illustrated in Fig. 6, to conform to the shape of the tooth and at the same time to form a recess for the end of the pick 13.

Figure 3:
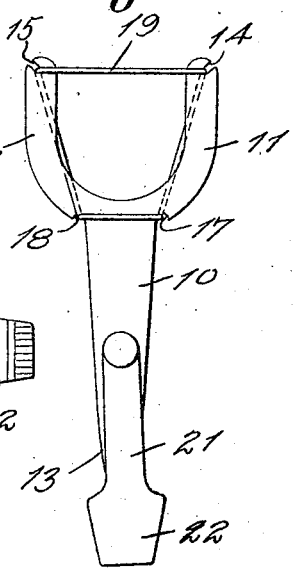
Fig. 3, is a view similar to Fig. 1, from the opposite side of the device.

A spring washer 23 is interposed between the end of the pivot 20 and the arm 21 in such a manner as to cause the pick to snap into the curved portion of said massaging member 22 thereby providing a frictional means for retaining the parts in the position illustrated in Figs. 1 and 3.

Figure 4:
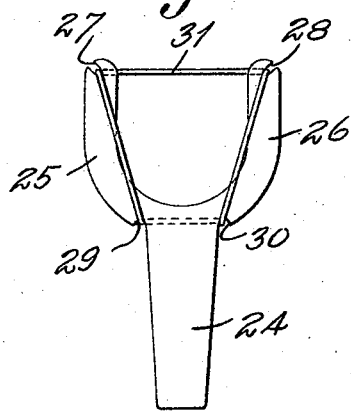
Fig. 4, is a view similar to Fig. 1 of the modified form of tooth cleaner.

In the modified form of the device illustrated in Fig. 4 the shank is designated by the numeral 24 and is provided with the parallel arms 25 and 26 provided adjacent their ends with notches 27 and 28 respectively which co-operate with the notches 29 and 30 arranged at the points where the arms join the shank for the reception of the floss 31. In the device it will be noted that the length of the shank 24 is considerably less than the length of the shank illustrated in Fig. 1 and it is quite obvious if so desired the end may be shaped to provide a gum massaging element.

Figure 5:
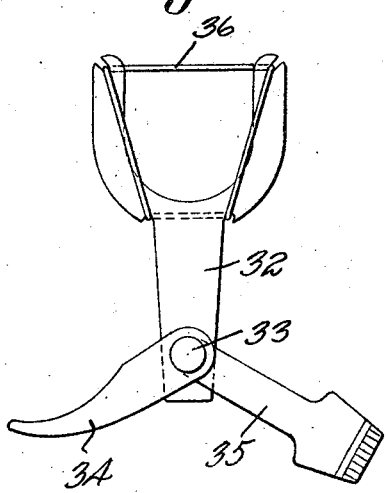
Fig. 5, is a view similar to Fig. 4 of a further modification.

In the modification shown in Fig. 5 the shank designated by the numeral 32 is constructed much in the manner of that shown in Fig. 4 with the exception that it is pierced for the reception of a suitable rivet 33 by means of which the pick 34 and the gum massaging element 35 are pivotally connected thereto. It will be understood that the opposite end of the shank is constructed as previously described for holding the dental floss 36 in place.

In use the shank provides a handle for the manipulation of the device and it is apparent that by turning the cleaner into such position that it lies transversely of the teeth the floss may be forced upwardly between the teeth to remove particles of food or other foreign matter which may have accumulated there. It is also obvious that by reversing the position of the cleaner the gums may be massaged and any foreign particles removed from between the gums and the teeth.

While in the foregoing there has been shown and described a preferred embodiment of this invention, it is to be understood that certain minor changes in the details of construction, combination and arrangement of parts may be resorted to without departing from the spirit and scope of the invention as claimed.

The member 22 which is a spade shaped member may be very satisfactorily employed for removing food or foreign matter that may collect at the base of the tooth or within the tooth cavity of the gum.

What is claimed is:—

1. A device of the class described comprising a shank, a bridging means at one end of said shank, a flexible member extending between the ends of the arms of the bridging means, and a pick at the opposite end of the shank and a movable spade shaped member associated with the shank and arranged to form a guard for the pick.

2. A device of the class described comprising a shank formed of flat metal, a pair of parallel arms formed integral with and extending longitudinally from the shank, a flexible member extending between the ends of the arms, and a gum massaging member pivoted to said shank.

3. A device of the class described comprising a shank, a pair of parallel arms extending longitudinally from the shank, and a flexible member extending between the ends of the arms, a pick at the opposite end of the shank, and a gum massaging member pivoted to the shank in such position that when lying parallel with the shank it will form a guard for the pick.

4. A device of the class described comprising a shank, a pair of parallel arms extending longitudinally from one end of said shank, said arms being provided with notches adjacent their outer ends and having similar notches adjacent their ends adjoining the shank, a flexible member adapted to lie in the notches in such position as to bridge the space between the ends of the arms, a pick at the opposite end of the shank and a gum massaging member pivoted to the shank in such position that when parallel therewith it will form a guard for the pick.

RUDOLF THUM.

Witnesses:
Jos Gilmore,
C. H. Luerssen.